United States Patent
Cheriton

(10) Patent No.: US 10,025,572 B2
(45) Date of Patent: *Jul. 17, 2018

(54) DYNAMIC COLLECTION ATTRIBUTE-BASED COMPUTER PROGRAMMING LANGUAGE METHODS

(71) Applicant: OptumSoft, Inc., Menlo Park, CA (US)

(72) Inventor: David R. Cheriton, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 14/842,479

(22) Filed: Sep. 1, 2015

(65) Prior Publication Data

US 2016/0124729 A1    May 5, 2016

Related U.S. Application Data

(63) Continuation of application No. 12/154,354, filed on May 21, 2008, now Pat. No. 9,158,519.

(51) Int. Cl.
*G06F 9/45* (2006.01)
*G06F 8/41* (2018.01)
*G06F 8/51* (2018.01)

(52) U.S. Cl.
CPC ............... *G06F 8/443* (2013.01); *G06F 8/51* (2013.01)

(58) Field of Classification Search
CPC .......................................................... G06F 9/45
USPC .................................................. 717/136–140
See application file for complete search history.

(56) References Cited

U.S. PATENT DOCUMENTS 5,842,020 A * 11/1998 Faustini .................... G06F 8/24
  715/866
2008/0027766 A1 * 1/2008 Carr .................... G06Q 10/02
  705/5

OTHER PUBLICATIONS

Oracle ("Javadocs" (download.oracle.com/javase/6/docs/api/)), 1993-2011.*

* cited by examiner

*Primary Examiner* — Jae Jeon
(74) *Attorney, Agent, or Firm* — Van Pelt, Yi & James LLP

(57) ABSTRACT

Simplified handling of dynamic collections having a variable number of elements at run time is achieved by providing for specification of collective properties of dynamic collections by a programmer. Such collective properties are distinct from type-member properties of the collection that follow from the types and type qualifiers of its members. Preferably, such dynamic collections are attributes (i.e., members) of an application defined type.

18 Claims, No Drawings

DYNAMIC COLLECTION ATTRIBUTE-BASED COMPUTER PROGRAMMING LANGUAGE METHODS

CROSS REFERENCE TO OTHER APPLICATIONS

This application is a continuation of co-pending U.S. patent application Ser. No. 12/154,354, entitled DYNAMIC COLLECTION ATTRIBUTE-BASED COMPUTER PROGRAMMING LANGUAGE METHODS filed May 21, 2008 which is incorporated herein by reference for all purposes.

FIELD OF THE INVENTION

This invention relates to automatic translation of input programs to computer executable output representations (e.g., by compilation or interpretation).

BACKGROUND

Dynamic collections are data elements for computer programming that can have a variable number of elements at run time. Although dynamic collections are widely used, they presently give rise to significant programming complexity. The reasons for this can be better appreciated in connection with a brief description of implementing dynamic collections in an object-oriented setting. Typically, such an implementation includes a set of interface procedures that manipulate the underlying data structure(s) selected to implement the collection. The interface procedures are usually the only way to access or change the underlying data of the collection, so the set of interface procedures is typically referred to as "the interface" for the collection. The collection may be part of an application defined type (ADT), and in such cases, operations on instances of the ADT rely on the collection interface provided as part of the ADT interface.

Manual coding of the interface for a collection is relatively difficult and error-prone programming. Implementation of simple operations on a collection frequently requires complex interface code to express top-level collection operations in terms of individual actions on a complex underlying data structure. Another difficulty is that it is easy to introduce subtle errors into a program by omitting consideration of all possible states a collection can be in. For example, if collection B is intended to be a clone of collection A, it is easy to see that additions and deletions relating to A should also be done for B. However, this is not sufficient to make B a clone of A. It is also necessary to ensure that when B is created, all possible states of A are provided for in the code to initialize B. Further complications may arise if B is created before A. The complexity inherent in providing such interfaces is presently one of the factors driving further evolution of programming languages. For example, the collection templates provided by the C++ standard template library use essentially every feature of the C++ language, and the languages Java and C# have recently been extended to provide support for generics to facilitate implementation of collections.

In some situations, the complexity of dealing with dynamic collections can be reduced with conventional methods. For example, some languages provide for data types which are dynamic collections (e.g., lists, variable length arrays, etc). In such cases, operations involving these data types can be coded more simply by a programmer than in the above approach. For example, if A and B are variable length arrays of floats provided as a language type, then the program statement A+B can cause the translator to automatically generate code to perform the implied element-by-element additions over the appropriate range of array indices. This substantially reduces the burden on the programmer.

However, such type-based collections are not a complete solution to the above-described difficulties. The main reason for this is that a considerable degree of design and implementation flexibility for dynamic collections has been found to be highly desirable in practice. Diverse dynamic collection data structures each have their advantages and disadvantages, and each such data structure typically also has diverse implementations, none of which is optimal for all cases. Therefore, it has not been possible thus far to devise a practical (i.e., comprehensible input code, efficient output code, and reasonable translator complexity) general-purpose programming language that provides for dynamic collection types in general. Instead, as in languages like LISP, one (or at most a few) dynamic collection types are typically provided by the language (e.g., lists for LISP). For problems that map easily to language-provided dynamic collection types, such languages can be very effective. However, for problems that don't map easily to the language-provided dynamic collection types, such languages tend to perform poorly.

Therefore, present-day handling of dynamic collections is typically performed according to one of the following two approaches: 1) A general approach (e.g., interfaces in object-oriented programming), which provides the variety and flexibility needed in practice, but incurs the disadvantage of complicated interface coding; and 2) A specialized approach (e.g., LISP, Haskell, etc.), which provides simplified type-based handling of some kinds of dynamic collections, but can have reduced performance for important practical applications.

Accordingly, it would be an advance in the art to provide a general approach for handling dynamic collections that is substantially simpler than the above-described manual coding of interfaces, without substantially reducing performance.

SUMMARY

According to embodiments of the present invention, simplified handling of dynamic collections is achieved by providing for specification of collective properties of dynamic collections by a programmer. The nature and utility of such specification of collective properties can be better appreciated by revisiting the subject of collection interfaces in conventional object oriented programming. A large part of the difficulties with such interfaces can be attributed to the fact that conventional collection interfaces are completely opaque to the translator. Although the collection is most likely an implementation of a known data structure having well-defined semantic properties, all the translator can see is data structures and a set of procedures that deal with the data structures. Typically, there is no way for the translator to deduce these semantics properties from the raw input code, even though the semantic properties of the collection follow from the data structures and procedures. Thus the translator is usually unable to provide any error checking more substantial than type checking.

By allowing a programmer to specify collective properties of dynamic collections, in accordance with embodiments of the invention, the translator is able to check for code that is inconsistent with the specified properties, and generate a translation time error. More powerfully, specification of collective properties of dynamic collections can be employed to reduce the programming burden of providing such interfaces.

For example, a translator can provide a set of primitive collection operations that a programmer can rely upon in writing interface code. Specification of collective properties of the collection allows the translator to select the most appropriate set of primitive operations for the specified properties. If all flavors of a given primitive procedure (e.g., accessor) have the same programming interface, then the programmer need not be concerned with implementation details of the primitive procedures that depend on the specified collective properties.

Collective properties of a collection are distinct from type-member properties of the collection that follow from the types of its members. More formally, a type-member property of a collection is any property of the collection that follows from the types (and type qualifiers) of its members. For example, if a collection G is a set of "const ints" in C++-like terminology, then the property of elements of G being unalterable after initialization is a member-type property of G following from its members being declared with type qualifier "const". The property of G that its elements are ints is also a typemember property of G.

A collective property of a collection is any specified property of the collection that 1) pertains to the collection itself, and 2) is distinct from the type-member properties of the collection. Operator applicability (as considered above) is one example of a collective property. Further examples of collective properties are described in detail below.

Dynamic collections having specified collective properties according to preferred embodiments of the invention are attributes of application defined types, and are therefore often referred to as dynamic collection attributes (DCAs), or as "attributes" for brevity, throughout this application. Here attribute is being employed in accordance with one of its standard meanings in computer science as "member of a larger structure". However, there may be some situations in which dynamic collections according to embodiments of the invention are global (i.e., not included in any sub-scope of the global program scope). For convenience of exposition, such dynamic collections are also regarded as "attributes", in the sense that the larger structure of which they are a member is the entirety of the input program.

To better appreciate the present invention, it may be helpful to compare and contrast embodiments of the present invention with conventional methods for handling dynamic collections. As described above, the conventional general approach for handling dynamic collections tends to involve extensive and difficult interface programming, e.g., as in object oriented approaches. In embodiments of the present invention, generality is retained and simplicity at the interface is improved by specification of collective properties and, preferably, by the use of translator-provided primitive collection procedures which depend on the specified collective properties. For example, a specified collective property could be the underlying data structure (e.g., singly-linked or doubly-linked for a list). If singly-linked is specified, then the translator provides a set of primitive procedures based on a singly-linked list data structure. If the programmer specified doubly-linked, then the provided set of primitive procedures is based on a doubly-linked list data structure. This aspect of embodiments of the invention can be regarded as providing a general primitive collection interface, and it is important to note that the number of primitive procedures to be supplied by the translator is not unduly large. Presently, it appears that a primitive translator-provided collection interface having four procedures (accessor, mutator, delete, and iterator instantiation) is sufficient for general purpose programming.

Another conventional approach for dealing with dynamic collections is to provide language types for some kinds of dynamic collections, but not others. Therefore, generality tends to be lost. In contrast, in embodiments of the invention, generality is preserved by providing a sufficiently expressive set of collective properties to cover situations of practical interest.

Importantly, and surprisingly, it has been found that the collective properties tend to be orthogonal or nearly orthogonal in terms of their effect on translator implementation. Orthogonality in this context can be explained by a simple hypothetical example. Suppose there are 10 collective properties, and each collective property can have one of two values. Then there are $2^{10}$ distinct possible combinations of properties. If the effect of collective properties on translator implementation is completely orthogonal, then the translator would need to include roughly 10 blocks of code, one block to implement each property. If the effect of collective properties on translator implementation is completely non-orthogonal, then roughly $2^{10}=1024$ blocks of code would be needed in the translator, one block for each distinct combination of properties. Near-orthogonality would describe a situation where the number of extra blocks of code to account for interactions between distinct collective properties is relatively small.

This orthogonality or near-orthogonality that has been observed in practicing embodiments of the invention is significant, because if collective property interactions did not have this favorable feature, then it would appear to be impossible to provide a set of collective properties sufficiently expressive for generality with a translator that is sufficiently simple for practical use.

In one embodiment of the invention, a method for automatically translating input code to a computer executable output program representation is provided. A first step of this method is providing an input source program, where the input source program is expressed in a language that provides for dynamic collection attributes (DCAs). Dynamic collection attributes are data elements capable of having a variable number of indexed members at run time.

The DCAs have member-type properties determined by types of the indexed members of the DCAs, and the language further provides for specifying collective properties of the DCAs that are distinct from the member-type properties, as described above. The input source program includes one or more instances of DCAs having specified collective properties, and also includes one or more expressions involving these instances of DCAs having specified collective properties. Collective properties can be explicitly specified by way of statements relating to a particular DCA and/or by way of reliance on default collective properties provided by the language to be used in the absence of any over-riding explicit specification. For simplicity, "specification of collective properties" of a DCA is taken to include default and/or explicit specification of collective properties.

A second step of this method is automatically translating such expressions to corresponding computer executable expression representations according to the specified collective properties. These expression representations are included in the computer executable output program representation, which is provided as an output.

As indicated above, preferably one or more of the instances of DCAs in the input source program are attributes of an application defined type, and are thereby components of an instantiatable scope. Ancillary types and operators can be automatically provided by the translator for such application defined types.

A wide variety of collective properties can be specified. Such collective properties include, but are not limited to: index specification, index uniqueness, index management mode, default index value, invasiveness, ordering, data structure implementation, behavior on access failure, iterator behavior on attribute change, idempotency on update, instantiating, transactional, concurrency-safe, exception on deletion, deletion on last external reference, relation to type-scope semantics, constraint relations to other attributes, and reactivity to changes of state. These collective properties are described in greater detail below.

Preferably, the expression representations include calls to one or more primitive DCA procedures, such as accessors, mutators, deletion procedures, and iterator instantiation procedures. Preferably, primitive accessors are nilpotent, exception free, and transactional. Preferably, primitive mutators are idempotent and transactional, and throw an exception if and only if an attempted change fails.

Generation of expression representations as above can be by way of collective-property-qualified relations. Such relations can provide templates which govern the expression representations according to the specified collective properties.

In some cases, expressions relating to DCAs having specified collective properties are given in declarative semantics (e.g., specifying a constraint).

In preferred embodiments of the invention, DCAs having specified collective properties can be derived from other DCAs having specified collective properties. This mechanism can support the creation of virtual DCAs that rely on other DCAs to actually provide storage of the individual data members. More simply, aliases and/or proxies of a DCA can be provided in this manner.

An important application for some embodiments of the invention is to provide a callback interface for simplified implementation of the listener pattern. In such situations, DCAs having the collective property of being reactive to changes of their own state are employed.

DCAs having specified collective properties can include within their scope declarations of sub-types and/or sub-DCAs. Such declarations have various applications, including implementation of the listener pattern.

Several key advantages are provided by embodiments of the invention:
1. Dynamic collection attributes as logical data members of application-defined types with minimal manual specification (largely by way of specification of collective properties) can reduce development and testing time. The collective properties associated with an attribute allow the programmer to specialize attributes to match a wide variety of application requirements.
2. Expressions and statements that contain attributes as a whole can be automatically handled by the translator, thereby eliminating the manually specified control flow for operations on collections, which reduces development time and improves software clarity.
3. Declarative statements and expressions can be supported in the context of an attribute declaration, reducing the software required to maintain state invariants relating to collections.

DETAILED DESCRIPTION

In preferred embodiments of the invention, a programming language provides the "dynamic collection attribute" construct as a constituent data element of an application-defined type. A dynamic collection attribute is specified by a name, type, index and by collective properties such as ordering, maximum size, etc. It designates a computer construct that supports maintaining and referencing zero or more members of the specified type, each designated by the specified attribute name and an index value of the specified index type. The attribute supports operations for adding and removing members as well as accessing existing members, including iterating over all the members in the collection attribute, and modifying existing members. It is a logical data element of an instance of the type that contains it.

A. Dynamic Collection Attribute Specification

In one embodiment of this invention, a dynamic collection attribute can be specified by the syntax illustrated in Example 1.

Example 1: Dynamic collection attribute specification

```
type T {
Typename attrName[indexName] {
'property1 = value1;
'property2 = value2;
operator +;
...
}
... }
```

This declares within the enclosing type scope T a dynamic collection attribute with name "attrName" and type Typename that is indexed by "indexName", with properties property1 and property2, etc. set as specified. It also provides support for the operator "+". Here, the indexName can name a field of the type identified by Typename, handling the case of the index field being in the member type. Alternatively, it can name a type, in which case the index field is a separate field of this type implemented by the collection attribute.

For example, a Experiment type in an application software might have a collection attribute of floating point values defined within its scope as in Example 2.

Example 2: Collection attribute specification

```
type Experiment {
    float sample[Date] {
        'ordered = byIndex;
        operator +;
        ...
    }
    ...
}
```

Here, the "sample" dynamic collection attribute can store a variable number of floating values, each identified by an instance of the Date type. Furthermore, the attribute has the property of being ordered by the ordering defined on the index type.

Then, when the translator encounters the statement:

Example 3: Typical Statement experiment0->sample += 3.0;

where "experiment0" is of type Experiment, it interprets this as meaning adding the value 3 to each member of the sample attribute based on the translator knowledge that this attribute represents a collection, the members are of type "float", and the collection supports the operator "+".

Similarly, the statement:

---
Example 4: Typical Statement experimentTotal->sample += experiment1->sample;

--- is translated to code that adds each value in the experiment1→sample collection to the corresponding entry in experimentTotal→sample, based on recognizing that each is a dynamic collection attribute supporting the operator "+".

Furthermore, on encountering the statement:
Experiment0→sample %=3.0;
the translator generates an error message because a modulo operation is not supported on this attribute or this attribute's type.

For another example, a Directory type in a file system software can have a dynamic collection attribute of subdirectories defined within its scope as in Example 5.

---
Example 5: Collection attribute specification

```
Directory subdirectory[name] {
    'parent = dir;
    'ordered = unordered;
    'instantiating=true;
    ...
}
```
---

Here, it is specified with the properties of having a back pointer field in each subdirectory called "dir" referring to the containing directory. It is also specified to be unordered and instantiating. In another embodiment, it is possible for the translator to infer that subdirectory[ ] is instantiating from its declaration as type Directory rather than Directory::Ptr. More specifically, this declaration can be taken to indicate that this attribute instantiates a Directory instance in its mutator, and thus the mutator takes the set of constructor parameters for Directory as its parameters. (In this approach, specification of Directory::Ptr as the type would mean it is non-instantiating, so the mutator accepts just the key and a pointer to an existing Directory instance, or just the pointer if the key is stored in the Directory object.)

In an embodiment, there is a property key word for each of the specifiable properties, similar to the example above of "'parent", "'ordered", etc. Each property that is not explicitly specified is set to a default value. In particular, there is a "'dataStructure" property that can be set to a particular collection template implementation name. If not set, it defaults to a standard collection template the matches the other properties, such as ordered.

Using this syntax, a programming language can specify a wide range of variants of dynamic collection attributes. Thus, the translator of the language has complete knowledge of the dynamic collection attribute semantics to enable it to implement expressions involving these attributes as well as data members and procedures implementing primitive operations on the associated data structure.

Using this knowledge, the generation of efficient code implementing expressions involving dynamic collection attributes is divided into: i) generation of procedures that implement the primitive operations on attributes, and ii) generation of imperative code that evaluates expressions involving attributes that uses, in part, calls to these primitive operation procedures.

For brevity, we subsequently use the term "attribute" in place of dynamic collection attribute. Similarly, the terms attribute programming language and attribute program are to be understood as referring to the dynamic collection attribute-based language of this invention, and a program written in this language, respectively. The next section describes these primitive operations and their semantics.

B. Attribute Primitive Operations

The primitive operations on an attribute are identified as:
i) accessor
ii) mutator
iii) delete
iv) iterator instantiation.

Each is preferably implemented by a separate generated procedure.

The accessor procedure for an attribute takes a single index value as a parameter and returns the member of the attribute corresponding to this index value. In contrast to a fixed-size data member, such as a singleton value or an array where access requires just read from memory at a specified offset, this procedure may entail navigation through a data structure such as a red-black tree or the computation of a hash value from the index value and a search into a hash table.

The mutator procedure sets a member entry to correspond to that specified by its parameters, creating the member object if the attribute has the instantiating property. In contrast to a fixed-size data member where changing an entry is simply a matter of writing at a specified offset, this procedure may entail instantiation of a new object, linking the object into a complex data structure as well as the access operation complexity above to determine if the entry already exists.

The delete procedure takes an index value as a parameter and removes that entry from the attribute. In contrast to a fixed-size data member where there is no delete ability, this procedure may entail unlinking an object from a complex data structure and freeing the object as well as the access operation complexity to locate the specified entry prior to these actions.

The iterator instantiation procedure returns an iterator object that allows reference to individual members of an attribute sequentially, by default initially referencing the first member of the collection or else indicating null. An increment operator on the iterator object causes it to reference the next member of the collection or else provide a null indication if there is no next member.

The iterator also provides access to the index value of the member object that it is currently referencing if any. In contrast to a fixed-size data member such as a single value or an array which is indicated by a small integer, the index type for an attribute can be large and complex, such as a variable-length string of characters and the number of members of the attribute can be small compared to the possible values of the index type so it may not be feasible to iterate over the members by incrementing the index value, starting with some initial value.

These primitive operations, or procedures substantially equivalent to these, are necessary because expressions and statements involving attributes can reference or modify an individual member of an attribute, call for the removal of a member or call for an operation to be performed on each member of the attribute. It is not feasible to implement the latter by simply incrementing the index value because it can have an unbounded extent as above.

These primitive operations are sufficient because: i) access to the state of a specific member or all the members is supported by the accessor and iterator, with the latter allowing access to subsets by skipping members not matching the subset criteria. ii) other operations to modify the state of an attribute can be implemented by reading a member value, performing a separate operation on it, and writing it with a new value. This sequence can be performed for each member of the collection in the case of an operation requiring iteration over the collection.

In an embodiment, the translator automatically generates a procedure corresponding to each primitive operation for each attribute that it encounters in the source input program. In the case of the iterator instantiation procedure, it also generates an iterator object type that supports the required operations for the associated attribute. In the case of the specification of an additional operation in the attribute definition, such as the "+" operation specified in Example 2, the translator also generates a procedure to perform that operation. The generation of these procedures is described further in a later section.

C. Dynamic Collection Attribute Expressions and Statements

When the translator encounters the specification of an expression or statement that references an attribute, it generates an internal representation that has a separate expression node per operator with this node designating the attributes that constitute its operands and its result using expression and statement parsing techniques that are well-known in the art for translators. For example, the statement of Example 4 generates a single expression node corresponding to the "+=" operation, designating "experiment1→sample" as the operand and "experimentTotal→sample" as the result location. A more complex expression produces an "expression tree", similar to known expression trees, except the operands can be attributes or conventional variables.

A processing sequence then recognizes this operation entails iteration over all the members of the attribute designated by "experimentTotal→sample", and thus generates an internal representation of: i) calling the iterator instantiation procedure, ii) a iteration loop using this iterator, and iii) performing the "+=" operation for each member identified by the iterator. Thus, the internal representation of the statement of Example 4 in a C++ like representation could be designated as:

Example 6: C++ Like Internal Representation of a Statement

```
for(SampleIterator i=experiment1->sampleIter( );i;++i) {
    experimentTotal->sampleInc(i.index( ), *i);
}
```

In this representation, the call to "sampleIter" invokes the iterator instantiation procedure, the call to "i.index" returns the current index value of the member being referenced by the iterator, "*i" returns the value of the member currently referenced by the iterator "i" and "sampleInc" corresponds to an increment operation on the specified member of "experimentTotal→sample".

This internal representation is then translated to executable code using techniques known in the prior art of compilation, which is feasible given that the representation in Example 6 is correct C++ providing that the "SampleIterator" type, the "sampleIter" procedure and the "sample" accessor procedure are defined appropriately.

In a preferred embodiment, the translator checks that the attributes specified in a statement or expression are allowed relative to the operators. For example, in the statement of Example 4, it checks that the index type associated with "experimentTotal→sample" attribute is compatible with the index type of "experiment1→sample", similarly for the value type of each attribute. In this vein, it would be erroneous to assign the attribute "subdirectory" of Example 5 to the "sample" attribute of Example 2 because the index types and the attribute types are not compatible.

The translator also checks whether the result attribute directly supports the specified operator, namely "+" in the above case. For example, if the "sample" attribute is defined without specification of the "operator +" property, the translator would translate the statement of Example 4 to the C++ like representation in Example 7.

Example 7: C++ Like Internal Representation of a Statement[2]

```
for(SampleIterator i=experiment1->sampleIter( );i;++i) {
    float tmp = experimentalTotal->sample(i.index( ));
    experimentTotal->sampleIs(i.index( ),tmp + *i);
}
```

Here, the procedure "sampleIs" designates the mutator procedure for this attribute. In Example 7, the increment action is performed by the sequence of accessing the current value of the index-specified member of the result attribute, incrementing it by a separate conventional add operation and writing the result back to this same index-specified member of the result attribute.

As a further example, when the translator encounters the input source line specified in Example 3, it generates an internal representation in a C++-like form as in Example 8.

Example 8: C++ Like Internal Representation of a Statement

```
for(SampleIterator i=experiment0->sampleIter( );i;++i) {
    i->inc(3.0);
}
```

That is, the iterator associated with the sample attribute is used to visit each of the members of the collection, incrementing the value of each. This implementation takes advantage of the specification of the "+" operator support specified for this attribute in Example 2, which provides the "inc" member function on the iterator used in Example 8.

In the absence of the "+" operator specification for this attribute, the Example 3 expression would be translated as in Example 9, using a separate addition operation rather than relying on functionality provided by the attribute implementation.

Example 9: C++ Like Internal Representation of a Statement

```
for(SampleIterator i=experiment0->sampleIter( );i;++i) {
    i->valueIs(i->value( )+ 3.0);
}
```

Thus, an attribute is specified with the + operator when it is expected to be incremented with sufficient frequency to warrant explicit procedural support for this incrementing or if automatically generated atomic increment is required, as provided in some embodiments. The same applies for other operators.

The checking and transformation mentioned above are implemented by techniques known in the art for compilation, extended to consider the additional properties associated with attributes. For example, checking the type compatibility between the index types of two attributes is similar to checking type compatibility in an expression in a conventional language, but a conventional language does not allow designation of application-specific index types so this check does not arise.

In a particular embodiment, the translator defines a specialized expression node for common statements and expressions and provides an executable code template for each such expression node. This executable code template indicates an internal representation for this operator on attributes, along the lines of the C++ like representation in Example 6 and 7, except with the designation of the names of the attributes and types as variables. Translator processing then binds the attribute and type name variables to the names of the attributes and corresponding types for the attributes specified in this statement or expression.

A number of common patterns of attribute expressions arise. For example, if the expression assigns another collection attribute to this collection, it generates imperative code to iterate over the assigning collection, using each member from this collection to add a corresponding member to the assigned collection, invoking the collection mutator procedure to achieve this. Moreover, it generates code to delete each member in the assigned collection that is not present in the assigning collection, invoking the delete procedure for the assigned attribute for each such member. In one case, the assigned attribute is the same type as the assigning attribute, so the value in the assigning attribute is simply assigned to the corresponding member in the assigned attribute. In another case, the assigned attribute has the instantiating property and the assigning attribute is a value that contains the parameters required to construct a member of the assigned attribute. In this case, the translator generates code to instantiate a member in the assigned attribute for each member in the assigning attribute.

In general, the translator generates code corresponding to the operation in the expression plus the properties of the referenced attributes, indicating an error when there is no legal interpretation based on all these considerations.

In an embodiment, the language provides a means to specify as part of an attribute definition an expression in terms of other attributes, declaring a relationship between the attribute being defined and these other attributes. Because this expression is specified in the declarative context of an attribute, it specifies that the given relationship must hold, rather than a specific action to perform, i.e. declarative semantics. This is referred to as a constraint. These semantics contrast with the conventional imperative specification of an operator as part of an expression which simply specifies a computational step to perform. In one embodiment, a declarative relationship can be specified in the body of the attribute definition, as illustrated in Example 10.

---

Example 10: Declarative relationship

```
ClientReactor csm[name] {
    = client;
}
```

---

Here, "client" was previously defined as an attribute. The operator "=" specifies that the csm collection attribute "is equal to" the "client" collection. However, because the translator has detailed knowledge of both the csm attribute and the "client" collection, it can infer meaningful semantics for this relationship when the collections are not directly compatible. In particular, in this example, the ClientReactor type is a "listener" object to the Client type which is the type of the "client" collection. In this scenario, the statement is interpreted to mean that csm should have an reactor instance corresponding to each instance in "client" rather than containing exactly the same type of members as "client". With this specification, the translator is able to insert code in the mutator procedure for "client" to instantiate a ClientReactor when a new client member is created and to insert code in the delete procedure for client that deletes the corresponding ClientReactor when a client is deleted, provided that client and csm attributes declared in the same translation unit of software. If the client attribute is declared in a separate translation unit, the implementation can use a trigger mechanism that allows code corresponding to these actions to be invoked on the creation and deletion of client members.

D. Attribute Translation

In an embodiment, when the translator reads an attribute specification in the input source program, it creates a defining attribute node in the abstract syntax tree, recording its name, type, index and other properties. Each explicitly specified property and constraint is also recorded. The properties that are not explicitly specified are recorded as their corresponding default value. For example, if the ordering property is not specified, it can by default be set to unordered. It also creates a separate attribute operator node for each primitive operation supported on the attribute and relates each such operator node with the first attribute node using an operator expression node, as described above for expressions. For example, an attribute operator node corresponding to the mutator primitive procedure for attribute "sample" is created with the name "sampleIs" and related to the attribute node for "sample" by an expression node corresponding to the assignment operator. Similarly, the attribute operator node corresponding to the delete primitive procedure for attribute "sample" is created with the name "sampleDel" and related to the attribute node for "sample" by an expression node corresponding to the delete operator. It may also generate a type node corresponding to the entry type of the attribute with ancillary attributes in this type node, as illustrated more fully below.

In subsequent processing, the translator then generates an internal representation of the declaration of required data members from the attribute node information, including the name, type and properties of the collection. It further generates, for each attribute operator node, the internal representation of the signature for the corresponding primitive procedure for the attribute. It then generates the implementation of this procedure based on the expression node or nodes connecting the attribute operator node to the base attribute node and possibly expression nodes relating the base attribute node to other attributes (in the case of side-effects). Thus, the generation of the implementation can be governed by the combination of the properties of the base attribute, the properties of the attribute operator being implemented and the properties of the expression node that connects these two, thereby handling the diversity of attribute primitive procedure implementations.

The translator further includes a set of collection templates, each specifying the implementation of a data structure parameterized in terms of the type of member in the collection and the index type used by the collection. Each such collection template has a set of known properties that relate to dynamic collection attribute properties. For example, one collection template implementing a so-called red-black tree data structure may ensure ordering based on the index type whereas another implementing a hash table may be unordered.

In an embodiment, the translator generates an internal representation of attributes in a C++ like representation, providing the primitive procedures as member functions of a class corresponding to the type containing the attribute. For example, the "sample" attribute of Example 2 could be represented internally in a C++ like specification as in Example 11.

---

Example 11: C++ Like Internal Representation of an Attribute

---

```
class Experiment {
    ...
    class SampleEntry : public BaseEntry {
        ...
        Date index_;
        float value_;
        SampleEntry * left_;
        SampleEntry * right_;
        SampleEntry * parent_;
    };
    typedef RedBlackTree<SampleEntry,Date> SampleMap;
    float sample( Date d ) const {
        SampleEntry * se = sample_[ d];
        return se ? se->value_ : 0.0;
    }
    typedef SampleMap::Iterator SampleIterator;
    SampleIterator sampleIter( ) const { return sample_.iterator( ); }
    void sampleIs( Date d, float f) {
        SampleEntry * se = sample_[d];
        if(!se) {
            se = new SampleEntry(d,f);
            sample_.newMember( se );
        }
        else se->value_ = f;
    }
    void sampleInc( Date d, float inc) {
        SampleEntry * se = sample_[d];
        if(!se) {
            se = new SampleEntry(d,inc);
            sample_.newMember(se);
        }
        else se->value_ += inc;
    }
    SampleMap sample_;
    ...
}
```

---

The elements of this representation are considered starting from the top in this example. First, the nested class SampleEntry is defined, as generated by the translator. This class is required because the collection is non-invasive and the collection templates only directly support invasive collections. These are collections in which the ancillary data members required by the data structure implementation are required to be in the collection member itself. Thus, the SampleEntry class includes a data member to store the index, a data member to store the actual value of the entry, called "value_" above, and data members to support the collection implementation, namely left, right and parent. These ancillary data members are selected in name and type based on the known requirements of the selected collection template, RedBlackTree, in this case. That is, this collection template implementation assumes that any direct member type has data members named index_, left_, right_ and parent_. It also assumes that the direct member type is a pointer to the type specified by first parameter of the collection template and that the index_ is of the same type as the second type parameter of the collection template.

Second, the typedef statement defines "SampleMap" as a name for the type instantiation of this collection template with the appropriate member type and index type, namely SampleEntry and Date. The collection template is selected based on the attribute being specified as ordered by its index. That is, it is the default collection template for an ordered dynamic collection attribute in this embodiment. This declaration is a convenience to allow declaration of a data member instance "sample_" near the end of Example 11, independent of the name of the selected collection template.

Third, the member function called "sample" looks up the entry in the SampleMap instance by its parameter value of type Date, returning the value of the "value" data member of this entry if it is found, and otherwise a default value of 0.0. This uses the indexing operator, operator[ ], defined in the RedBlackTree collection template. This member function is used to access a value in the collection specified by an index value. In this particular C++ representation, the member function may be inlined. That is, the executable code corresponding to the procedure implementation is generated at the point of access to a specific attribute member, rather than in a separate location with the resulting procedure called from this point of access.

Fourth, the next "typedef" defines SampleIterator as the name for an Iterator type for the Sample instantiation of the collection template. The "sampleIterator" member function is defined to return an instance of this type, which supports iteration through all the entries in the attribute. Here, the collection template defines an iterator type that supports iteration over the members recorded in the red-black tree.

Fifth, the "sampleIs" member function is the corresponding mutator primitive procedure, generated by an attribute operator node corresponding to the procedure and an expression assignment operator mapping from this node to the attribute node.

Finally, the "sampleInc" member function supports incrementing a specified entry in the sample collection, the primitive operation procedure generated corresponding to the "+" operator defined on the attribute.

The definition of an attribute can include specification of the "template" to use as part of its implementation. For example, if the "'template" property is specified as AVLTree, a collection template named AVLTree is used instead of the RedBlackTree collection template.

In a preferred embodiment, each collection template implements a common interface to be used by the translator, including the name of the value data member, name of the index data member, name of the iterator type, etc. Only the actual data structure being implemented differs. In this case, an application can register a new collection template and specify this template by name, and the translator can proceed to use this template without application-specific modification to the translator.

As another example, when the translator reads an attribute specification as in Example 5, it recognizes that this attribute is specifying an instantiating invasive collection. Thus, it generates an internal representation in the form specified in Example 12.

---

Example 12: Instantiating Invasive Attribute

---

```
class Directory {
    ...
    Directory * next_;
```

-continued

Example 12: Instantiating Invasive Attribute

```
        Directory * dir_;
        String index( ) const { return name_; }
}
typedef HashTable<Directory,Name> Subdirectory Map;
Directory * subdirectory( Name name ) const {
        return subdirectory_[name];
}
Directory * subdirectoryIs( Name name ) {
        Directory * d = subdirectory_[ name];
        if(!d) {
                d = new Directory(name, this);
        }
        return d;
}
```

This example illustrates a number of aspects arising from the differences from the previous examples. First, as an invasive collection, the "next" data member required by the HashTable collection template is inserted into the implementation of the Directory type. Similarly, the "dir_" data member is inserted in this Directory class to support the "'parent" property. Also, the "index" member function provides access to the name for using the "index" data member name, as expected by the HashTable collection template.

The typedef for SubdirectoryMap specifies the entry type to be the Directory class because this collection is invasive. That is, the member type is the same as the entry type. Similarly, the "subdirectory" accessor function directly returns the entry returned by the HashTable indexing operator, (operator[ ] in C++).

Finally, the "subdirectoryIs" mutator instantiates a new member if necessary given its constructor parameters, which are just its "name" in this case plus the parent backpointer, passed as "this", i.e. the current object in C++ form. This parameter is stored in the "dir_" data member of the instantiated Directory instance, thereby providing the backpointer required by the "'parent" constraint.

The resulting internal representation, logically equivalent to the C++-like representation described above is then translated into an executable form using techniques well-known in the art, realized in various C and C++ compilers and interpreters.

Using this mapping to an intermediate form as above, the large number of relevant collective properties of collections can be realized by a translator with bounded and reasonable complexity. Consideration of some collective properties follows:

Index specification: The index can be specified either as an attribute of the member type (in which case this attribute determines the type of the index) or else as a type in the case of a non-invasive collection. The specification of an index type with a large and possibly unbounded extent specifies an attribute with a logically unbounded number of entries. The ordering defined on this index type then determines the order of a collection if the collection is defined as ordered by index.

Other properties of index, such as uniqueness can be indicated by a Boolean property and simply effect the choice of data structure or collection template (when non-uniqueness is allowed) and the addition of a uniqueness check when uniqueness is required. Similarly, an auto-managed key can be designated by a property, causing the translator to allocate a new key value instead of expecting it as a parameter.

A default key value can be supported by a Boolean property that causes the translator to provide the default value in, for instance, the instantiation of an iterator.

Invasive/Non-invasive: The distinction can be specified by whether the type of the attribute is specified as a pointer type or as the actual object type. Furthermore, each attribute is recognized to have an entry type as well as an interface type, which is the type specified for the attribute and the type of instances logically stored by the attribute. If non-invasive, the translator generates a type to act as this entry type. This generated type follows a relatively simple pattern in that it contains a data member storing the value of the entry type plus any data members required to support the collection, including the index data member and any "next" pointer data members. If the collection is invasive, the translator designates the entry type to be the same as the interface type and inserts these extra data members into this interface type.

Ordering: The ordering designation changes the default collection template (and thus implementation data structure) to achieve the desired ordering. The use of templates with a common interface means the internal representation only changes in the identification of the template, not other elements of the internal representation.

Data Structure Selection: The ability to specify a data structure implementation as a collection template and to designate a collection template for a specific attribute together with the uniform interface provided by each such template allows specification of arbitrary data structures without changes or complication to the translator itself.

Idempotency: the translator generates a check for a member with the specified key before attempting to add the entry as a new member, having this operation complete immediately if the member is already present, thereby providing idempotency. Otherwise, it may throw an exception if the index key is required to be unique.

Access fails semantics: a Boolean property can indicate whether the attribute implementation should throw an exception or return a default value when the specified member is not present. The translator simply modifies the generated code to either throw an exception or generate the default based on this property.

Iterator semantics: The two main possibilities for iterator semantics are 1) creating a snapshot (by way of a separate collection type) of the collection at the time the iterator is instantiated and iterating over the snapshot, and 2) iterating over the collection itself and employing collection version numbers (described below) provided by the collection template to identify situations where the collection changes in mid-iteration. Iteration can be defined to either proceed, retry or throw an exception when such a change is detected.

Transactional/concurrency: the translator can handle these properties by adding extra generated code around the calls to operations defined by the collection template. For concurrency, the collection template can provide an atomic insert operation that is specified in terms of version of the collection, failing if the version has changed. In particular, a read can be implemented by:
i) saving the collection version number,
ii) performing the lookup operation provided by the collection template,
iii) checking the version number
iv) retrying the operation if the version number has changed.

An update can be performed as:
i) creating the new candidate member object
ii) getting the version number iii) calling the collection template-provided insert operation, having it return a set of pointers to locations to update in order to complete the operation, and
iv) atomically performing this update if the version number has not changed (using suitable non-blocking primitives such as (double) compare-and-swap).

Thus, the translator is able to insert the required synchronization code into the primitive operation procedures depending on the target environment. These properties can also be implemented by providing a specialized collection template for each desired behavior, with the translator selecting the correct one based on the specified properties. Finally, constraints on an attribute or properties that specify its role as part of the enclosing scope type are noted in the internal representation of the attribute and cause relatively orthogonal modifications to the generated executable code relative to other properties. In particular, an attribute can be specified as the effective "value" of a type, causing the type to behave as an instance of this collection. For example, an collection type of Directory's can be specified as in Example 13:

---
Example 13: Collection Type Specification
---
```
type MyDirectoryCollection {
    Directory value[name] {
        'isValueAttr=true;
    }
}
```
---

Typically, a collection type of this nature contains a single collection attribute but additional attributes may be provided, including those that provide extra information about the value collection. The combination of this value property designation and the semantics and properties of the value attribute allow the translator to infer and utilize the properties of the collection type. In particular, the translator can infer the semantics and properties of a collection or singleton attribute from the semantics and properties of the attribute's type as well as the attribute semantics above. In a conventional language, the translator can infer properties from the type of a variable in a similar fashion. However, in this invention, the more extensive semantics and properties of the attribute are provided to the type as above, which are then available in declaration of an attribute of this type, providing far more higher-level meta-information to the translator. For example, the translator can know that an attribute is a collection of collections, with full knowledge of the types, index and properties at each level and how they are represented.

In a preferred embodiment, an operator such as "+" is defined in the scope type in terms of the corresponding operator on each of its attributes. Because the translator knows the operators available on each of these attributes, it can automatically generate code corresponding to the operator definition for the type if the attributes support this operator and generate an error message if the specified operator is not supported. For example, in one embodiment, support for addition on a type StatisticsArray is specified with the "+" operator as in Example 14.

---
Example 14: Type Operator Specification
---
```
type StatisticArray {
    Count value[Id] {
        'isValueAttr=true;
```
---
Example 14: Type Operator Specification
---
```
        'isArray=true;
    }
    operator +;
}
```
---

The translator can infer that + on StatisticArray as a collection type is defined as member-wise addition(+=) on each member of the value collection and further infer that this addition per member is supported if the value attribute supports an additive mutator (e.g. valueInc(inc)) or the Count data type supports the addition operator or the representation type of Count supports the addition operator. In the latter case, the current value may need to be converted to some base type such as a built-in type, the addition performed and then the result converted back to the Count type using a constructor for the Count type. In any case, the meta-information available to the translator about each attribute and the type as an aggregation of such attributes together with the conventional member-wise definition of operators allows auto-generation of operators. Moreover, the auto-generation of operators ensures that these semantics are provided by the underlying types at each stage, recursively.

These same techniques can be used to specify properties that are also useful with fixed-sized conventional data members, including: constant, mutable, inline, static, aliasing, reference-counting, operator applicability, constructor parameter, triggering on update and so on. These properties compose with those above to allow the translator to generate code that implements an attribute with all the required properties from a relatively small number of "meta-templates" for the generated code. We use the term "meta-template" to allow for the fact that portion of the general code templates are inserted, removed and combined based on these properties. In particular, these properties can be indicated internally by a combination of flags on the attribute nodes, attribute operator nodes, and expression nodes.

In a preferred embodiment, an attribute can be specified as being reactive to the objects in its collection, meaning that there are one or more procedures defined in the scope type of the attribute that are triggered by changes to objects in the collection. In this case, the translator generates code that registers these one or more procedures with the trigger mechanism in each object that is added to the collection attribute and remove these procedures from that object when it is removed from the collection.

In a preferred embodiment, a triggering object type defines an ancillary nested type, Notifiee, that defines the callback interface for trigger procedures. The translator then generates the entry type for a reactive attribute as a derived type of this callback interface, overriding the callback functions defined in this interface to execute the specified procedures on callback. When a new member of the attribute is added, an instance of the entry type is instantiated and initialized for callback. When a member is deleted, this entry instance is deregistered for callbacks and deallocated. Thus, the translator is able to generate reactor attributes that invoke triggered procedures on the members of its attribute (collection).

E. General Attribute Semantics

In one embodiment, reading or accessing the attribute is always nilpotent (that is, it has no effect on the attribute). It can also be defined to never fail or throw an exception by defining it to contain a member for each legal value of the index type, albeit some being the default value. For example, the subdirectory collection returns the default null value if the named entry has not otherwise been set. Correspondingly, the mutator is defined to be idempotent (in the sense of calling the same operation twice has the same effect as once) and transactional—either succeeding in setting the specified entry to the new value or else throwing an exception and leaving the collection in its original state.

In a preferred embodiment, these uniform semantics simplify the translator implementation required to generate code for operations on collections because all attributes have a common set of base semantics. A translator can support a small set of different semantics at the cost of greater complexity, but experience has shown that a wide variety of programs can work with these semantics. There has yet to be an application that really calls for different semantics. The particular accessor semantics minimize overhead by precluding side-effect state changes and exceptions. In many cases, an application needs to check the object or value returned by an accessor in any case, so checking for the default value does not add overhead. Moreover, when needed, the caller of an accessor can store the result in a restricted type that throws an exception when written with the default value, thereby providing an exception on "not found" even if not supported by the collection itself. For example, in one embodiment, the statement:

Directory::ValidPtr sd=d→subdirectory("foo");

would return a null pointer that would cause the ValidPtr type to throw an exception when assigned to, because of the null value.

The mutator semantics can be provided by checking whether the named member is already present before adding the member, and skipping the addition if so. Moreover, a mutator must be able to fail, given that adding a member to a collection can require extra resources, such as memory, so it must have the option of throwing an exception. The transactional semantics require that an exception during the execution of a mutator return the attribute to the state before the execution of the mutator. These transactional semantics are important because, in the case of failure, the mutator cannot make forward progress, so going back to an earlier well-defined state is preferable to leaving the object in some arbitrary state. Additional advantages to these semantics are described below.

These semantics also restrict attribute semantics sufficiently to allow a generic (i.e. type-independent) implementation of the listener pattern, which is referred to herein as "notification". In particular, other software objects can register to be called back when an attribute is modified, with the callback providing an indication of the attribute that was modified. To provide this facility, the translator effectively inserts code in the attribute mutator procedure to iterate over a registration list, calling back each registered software object. It also generates an interface to be used by this callback mechanism. For example, in one embodiment, the callback function signature for the attribute in Example 3 would be (in C++ syntax): void onSubdirectory(Name); i.e. a function named for the attribute, prefixed with the "on" string taking the index type as the single parameter. Each registered object implements such a procedure, taking the required local action when this callback procedure is invoked as part of changing the "subdirectory" attribute. Because this support for the listener pattern is mechanically determinable from the attribute specification, the translator can automatically generate all the support required for this pattern, relieving the programmer of this burden. Moreover, because the state of the attribute is the only aspect visible to a callback client, it is always sufficient to simply indicate in the callback the attribute and key of the member (if a collection) that changed. The invoked procedure can then use this information to access the modified member using the accessor primitive operation procedure. Overall, the restricted specified interface and semantics of the dynamic collection attribute of this invention allows a mechanical (and thus translator) means to generate the callback mechanism for each object, relieving the programmer of this burden. One use of this mechanism is to implement reactive attributes, as described earlier.

The attribute specification and semantics allow the translator to automatically generate software that transforms an attribute instance to and from a serial representation, as required for network transmission. In particular, serializing a single member of a collection entails serializing the index key value and the member value itself, or the constructor parameters in the case of an instantiating attribute. This provides adequate information to deserialize and simply add the member to the corresponding attribute on the receiving end. Moreover, because of the idempotent semantics of attributes, repeated transmissions of the same key/member has no bad effect but simply ensures that the state between the sender and receiver converges. Correspondingly, transmission of the entire attribute simply entails transmission of all the members in the collection. The serializing and deserializing of the member object is handled recursively based on each type being effectively an aggregate attribute as described later.

In one embodiment, the types of the programming language are divided into value types and indirect types, i.e. types to which one can have a pointer or indirect reference. The latter have an ancillary pointer type defined for each such class. One syntax for a pointer type for an indirect type T is T::Ptr. Continuing the above example of Directory as an indirect type, the pointer type for Directory is Directory::Ptr. (In one embodiment, this pointer type implements the so-called smart pointer reference counting, allowing for automatic deletion of objects when all references are removed, eliminating the need for the error-prone manual deleting of objects.)

F. Categories of Attribute Properties

The properties of an attribute can be divided into the three categories of:
1. declaration properties
2. ancillary features
3. implementation refinement Declaration properties cover aspects of the attribute's interface to other software modules such as whether it is a mutable attribute, whether it is to be constructor argument to the enclosing scope and whether its iterator provides access members in order or not. The ancillary features include whether it provides notification on update, the default value to use with the collection and so on. The implementation refinement properties include whether the accessing code should be inline or not, whether the implementation should support concurrent access or not, whether the implementation should be invasive or not and the data structure to use for implementation.

A key recognition with these properties is that the number of such properties is bounded to a relatively small number. Considering the first category, there are a limited number of aspects about the declaration given only type, name and index are specified and the bounded number of concepts in programming that have arisen, such as mutable, constant, various categories of pointers and such like. This is similarly true for the other two categories. Also, most of these properties are largely orthogonal in their impact on the implementation so the translator complexity does not increase multiplicatively in the number of properties. For example, the property of having a parent pointer is independent from the mechanism of notifying on update which is independent of whether the attribute is mutable or not. Moreover, some property combinations are not allowed. For example, the properties controlling the types of pointers used are only applicable with a non-value type attribute. Consequently, real application software has been developed with a translator supporting under 32 properties and the translator complexity has been relatively low, largely reflective of essential independence of these properties.

In one embodiment, the translator has a well-defined interface to support the development and inclusion of extension modules that can be added to the translator. In one case, such a module can handle representation generation, namely the specifics of transforming an attribute to and from a specific representation, such as network representation of the state. Consequently, a new representation can be supported by the translator by writing a new module to this interface that implements this new representation. This structure is similar to the conventional translator approach of separating the code generation module that is specific to a particular target processor architecture from the rest of the translator, allowing the translator to be retargeted with simply the addition of a new code generation module. In the preferred embodiment, the translator of an attribute programming language has a similar structure to support retargeting to different target languages/architectures in addition to the ability to support multiple representations.

Consequentially, a translator can be realized that provides the wide range of attribute interfaces, implementations and representation while being of practical complexity and not being required to change as the result of new data structure or representation requirements.

G. Fixed-Size Attributes

In one embodiment, the omission of specification of the index in an attribute definition indicates a singleton attribute, i.e. an attribute that contains exactly one member in the collection (so there is no need for the index). In many applications, the singleton may be the common case. Nevertheless, it can be provided as a restriction and simplification of the general dynamic collection attribute. For example, Example 14 indicates that a singleton attribute can be indicated by an attribute declaration that omits the index specification.

Example 14: Singleton attribute specification

```
Count accesses {
    'notifyOnUpdate = true;
    ...
}
```

Moreover, the same attribute semantics are straight-forward to provide for a singleton attribute, restricting them to the single member. Similarly, an index type with a small fixed range, such as an "enum" can indicate an attribute with a small fixed number of members, i.e. an array.

H. Type Generation

In an embodiment, a type is specified as an aggregation of attributes, both collection and singleton, as illustrated in Example 15 for the Directory type. The optional identifiers after the type name, in this case just Fwk::Entity, identify the base type(s) from which this type inherits. Inheritance has similar semantics to those of a conventional object-oriented language in defining the type as a derived or sub-type of the type specified as a base type. However, it also inherits the attributes of the base type, rather than inheriting the conventional data members and member functions, to use C++ terminology.

Example 15: Type specification

```
type Directory Fwk::Entity {
    Directory subdirectory [name] {
        'parent = dir;
            'notifyOnUpdate = true;
    }
    Count accesses {
        'notifyOnUpdate true;
    }
}
```

As an aggregate attribute, the type provides its semantics to the translator as an aggregation of those of its attributes, and its base types, if any. For example, serializing an instance of the type is realized as serializing each attribute of the type. Similarly, the constructor parameters for a type correspond to the sequence of attributes with the property of being designated a constructor parameter. Furthermore, the notification interface to an object is a type corresponding to an aggregate of the notification interfaces for each of its notifying attributes. In one embodiment, the translator automatically generates an ancillary (and nested) type called Notifiee corresponding to this aggregate notification interface, as illustrated in Example 16 for the Directory type.

Example 16: Notification interface

```
type Directory Fwk::Entity {
    type Notifiee Fwk::PtrInterface {
        onSubdirectory[name];
        on Count;
    }
    ...
}
```

Consequently, a module requiring notification from a Directory can define a type derived from the Directory::Notifiee type above and define actions associated with each of onSubdirectory and onCount to handle callback notifications when these attributes are updated. It can also achieve this functionality by defining an attribute of type Directory that is specified as reactive.

I. Ancillary Type and Operator Generation

Ancillary types and operators may be appropriate to generate for a given type based on the properties of the type and its attributes. In particular, the translator can infer the category of a type from its base types. For example, a type is a value type if it has no base type or its base type is a value type. A type is an indirect type if derived from an indirect type. In one embodiment, the translator provides a root base indirect type, for example named Fwk::PtrInterface, as specified as the base type of Notifiee in Example 16.

The translator can then infer the need to generate the equal and non-equal operators for value types and the ancillary pointer types, e.g. Directory::Ptr, for indirect types. Moreover, in an embodiment that distinguishes a pointer with write access from one that allows only read access (non-const and const in C++ terminology), the translator can generate a read-only pointer type as well as the read-write pointer type. Also, in this case, the translator can generate a const and non-const Notifiee interface to accommodate modules that need read-only versus read-write access to the notifying object. Furthermore, an embodiment can support pointer types that require a non-null value, referred to as a ValidPtr in one embodiment. The translator can infer and generate all of these pointer and notifiee types, optionally regulated by properties specified with these attributes and types.

These capabilities allow the translator to provide types that designate fine grain control and specification of access and operations without burdening the programmer. For instance, a programmer can specify non-null read-only access to an object by using the ValidPtrConst ancillary type, relying on the translator to automatically generate this pointer type.

J. Derived Attributes

In an embodiment, an attribute can be specified as defined based on another existing attribute, as illustrated in Example 17.

Example 17: Derived collection attribute specification

```
type ContentDirectory Directory {
    Rights distribution rights;
    Corporation copyrightHolder;
}
ContentDirectory contentSubdirectory[name] = subdirectory {
    ...
}
```

In this example, the "contentSubdirectory" is defined in terms of the instantiating "subdirectory" attribute of Example 5. It allows instantiation of instances of the derived directory type "ContentDirectory" in the same base collection attribute as defined by "subdirectory". In particular, each instance created by the "contentSubdirectory" attribute also appears as a member in the "subdirectory" attribute. A derived type attribute is restricted to using a derived type of the type of its specified base attribute. For example, if the "ContentDirectory" was not derived from Directory in Example 17, it would be an error to define "contentSubdirectory" to be derived from "subdirectory". Derived attributes can also be value collections, including pointers to derived types provided that they obey the derived type rule.

In the simple case when the type of the derived attribute is the same as that of the base attribute, a derived attribute is an alias that simply provides an alternative name for the actual attribute.

A derived attribute can be specified with the same name as the base attribute if the former is defined in a derived type scope relative to the latter. In this case, the derived attribute overrides the base attribute behavior.

In another case, a derived attribute can represent a subfield or range of the base attribute, as indicated in Example 18.

Example 18: Subfield alias attribute

```
U8 opcode = instruction[0::7];
```

Here, the attribute opcode is defined as the subfield formed by the first 8 bits of the "instruction" attribute. In the simple case, the range identifies exactly one member, thereby defining a singleton attribute derived from the base attribute. More generally, a derived attribute can represent a collection that is a subset of the members of another collection defined in terms of some matching criteria.

A derived attribute can also represent a projection of the base attribute, presenting a subset of the attributes in each member of the base attribute or even some transformation of the base attributes.

Example 19: Projection alias attribute

```
type ContentDirectory Desc {
    Rights distribution rights;
    Corporation copyrightHolder;
}
ContentDirectoryDesc contentDirDesc[name] = contentSubdirectory;
```

In Example 19, each instance of ContentDirectoryDesc is initialized per attribute from the attributes of the corresponding object in the contentSubdirectory collection. In a preferred embodiment, this derived attribute instantiates these value instances when the derived collection is accessed and does not require separate storage. Similarly, calling the mutator for this derived collection updates the corresponding fields of the base attribute member.

Finally, an attribute may be defined in terms of two or more base attributes as being the union of the members of the base attributes, as illustrated in Example 20. Here the "vehicle" attribute is derived from car, truck and boat Example 20: Union Derived Attribute

```
type Fleet {
    Car car[ name];
    Truck truck[name];
    Boad boat[ name];
    Vehicle vehicle[name] = car || truck || boat;
}
``` as the union of these collections. In this case, the derived attribute is required to be a common base type to the base attributes and each collection is required to support a type-compatible key. In an embodiment, the union derived attribute entirely depends on the storage of the base attributes. Here, the "||" operator is used to specify union.

Thus, the accessor looks up the key in each of the base attributes to locate a specified member. Similarly, the iterator for the derived attribute proceeds across each base attribute in sequence, providing the behavior of it being a normal attribute. The case of a member in two base attributes in the union having the same key can be handled by either providing just the first member on access to the key or by returning all members in the union that match the key. The choice is determined by the unique key collective property of the derived attribute.

In general, an embodiment can provide a number of operators for defining attributes in terms of other attributes. A derived attribute provides what can be described as a "virtual collection" in the sense of a collection that appears to exist yet exists only in terms of other base attributes.

In each of these cases, the derived attribute is derived in the sense that its implementation is based on the implementation of the base attribute(s), using some of the storage and procedures used by the base attribute(s). However, an attribute can be defined to provide a separate storage implementation for the union-derived attribute, as in Example 21, similar to the structure provided in Example 10.

| Example 21: Attribute with Union-specified Membership |
|---|
| Vehicle vehicle[name] {<br>   = car \|\| truck \|\| boat;<br>} |

In this case, each member added to a base attribute causes a pointer to the new member to be added to the derived attribute, similarly on deletion. This follows the model that constructs within the "{ . . . }" scope of the attribute specify properties of the attribute, including its relationships to other attributes as opposed to specifying the base definition of the attribute, as arises with derived attributes.

K. Extended Attribute Context

In an embodiment, the translator supports the specification of types and attributes within an attribute context.

| Example 22: Attribute Context Specification of Type and Attributes |
|---|
| Directory::Ptr remoteDir[name] {<br>   type CorruptedState {<br>      U32 errors;<br>      ErrorDesc errorDesc[Integer];<br>   }<br>   CorruptedState corruptedState;<br>   ...<br>} |

In Example 22, a type "CorruptedState" is defined for the non-invasive collection attribute "remoteDir". Also, an attribute "corruptedState" of this type is defined. The translator interprets the declaration of a type definition within an attribute context as defining this type within the scope of the entry type automatically defined for this attribute. It interprets the declaration of an attribute within another attribute context as defining an attribute in the entry type of this other attribute (e.g., here corruptedState is an attribute defined within the scope of remoteDir). In an embodiment, each such attribute is implemented as an extension to the entry structure per member used in a non-invasive collection implementation.

These attributes and types can be made available to the callback procedures of a reactive attribute and to other procedures through a special implementation interface to the attribute that treats it as an invasive collection of these entry objects.

L. Introspection Support

In an embodiment, the translator can generate an executable description of each attribute so this information is available for query during execution of the program. This supports so-called "introspection", often useful for interfacing from a separate interpretive programming language environment such as PERL or Python. In particular, the translator generates introspection information that couples together the primitive operation procedures of the attribute so they are known to be associated with a given attribute. In contrast, an introspection mechanism in a language without attributes cannot indicate which procedures are associated with a given collection.

In an embodiment, the translator can translate the high-level specification to one or more selected output representations, which can include conventional programming representation (such as C++) but also a textual description as well as possibly a hardware description language specification. In the former case, it can also generate the machine language instructions to implement the specified program instead. In the latter case, the translator may impose output-specific restrictions on the input to enable it to be realizable in a limited output representation, such as the hardware description language. Within this constraint, the translator is able to generate multiple output realizations, such as both a C++ and a Verilog realization from the same input specification.

This same structure can be used to automatically generate software that maps to a persistent storage representation. That is, the serializing is to a storage format and the deserializing is from the storage format.

In an embodiment, an attribute-based language includes the ability to specify one or more imperative contexts in which conventional imperative language constructs, such as "while" loops, "for" loops and "if . . . then . . . else" can be used. In such an imperative context, operators between attributes have the conventional imperative semantics. However, operators that specify an attribute as an operand or as a result are interpreted relative to these attribute semantics and properties. Thus, for example, in an imperative context, the statement:

| Example 23: Imperative statement |
|---|
| csm = clientDir::client; | would be similar to that described for Example 10, but performed as a step of a computation. In this way, the control provided by conventional imperative programming can be available in an attribute-based language yet the expressive power of the attribute can also augment the capabilities of an imperative context by way of extending the operator semantics.

In summary, dynamic collection attributes having programmer-defined collective properties as a programming language construct provides substantially improved power, flexibility and simplicity of programming. DCAs can be explicitly and directly specified in both a type definition context and in an imperative context (as a local variable). Representing a collection of member objects in this manner allows the translator of the language to automatically generate an executable implementation that handles the complex task of accessing and maintaining a collection properly encapsulated in the scope of an object. This construct also allows the translator to infer complex implementation processing from the specification of expressions in terms of attributes, whether in a declarative (constraint) context or in an imperative context. The specified interface and semantics associated with a collection attribute further allows the translator to automatically infer and generate code to realize various common design patterns, such as the factory pattern, the listener pattern and the iterator pattern. The ability to specify properties associated with attributes allows customizability to meet the needs of each individual application. By providing a defined implementation interface to a data structure realization as a template, the translator can support, as one of its properties for attributes, the selection of any available data structure implementation. By knowing the implementation of each attribute, the translator can further provide automatic generation of code to handle concurrent access as well as distributed operation. Thus, the dynamic collection attribute as described above substantially alleviates the problems associated with supporting programming of collections, while avoiding unbounded complexity in the language and translator implementation.

The invention claimed is:

1. A method, comprising:
    providing an input source program to a translator, wherein:
        the input source program includes one or more expressions involving one or more instances of dynamic collection attributes (DCAs);
        the DCAs include data elements capable of haying a variable number of indexed members at run time;
        a specification of the one or more instances of DCAs includes at least: a name, a type, an index, and one or more collective properties;
        the type specified for the one or more instances of DCAs establishes the type of collection and the type of members in the collection, for the corresponding one or more instances of DCAs;
        the one or more instances of DCAs have member-type properties determined by types of the indexed members of the DCAs; and
        the one or more instances of DCAs have specified collective properties that are distinct from the member-type properties;
    automatically inferring, using a translator, additional collective properties for the one or more instances of DCAs based on the type specified for the corresponding one or more instances of DCAs, which were not included in the specified collective properties, using semantics for relationships of collections;
    automatically translating the one or more expressions to corresponding computer executable expression representations based at least in part on the specified collective properties and the additional collective properties; and
    providing the computer executable output program representation as an output.

2. The method of claim 1, wherein one or more of the instances of DCAs are attributes of an application defined type, and are thereby components of an instantiatable, scope.

3. The method of claim 2, wherein one or more ancillary types and operators are automatically provided for the application defined type.

4. The method of claim 1, wherein the collective properties further comprise one or more properties selected from the group consisting of: index specification, index uniqueness, index management mode, and default index value.

5. The method of claim 1, wherein the primitive operations include one or more of accessors, mutators, deletion procedures, and iterator instantiation procedures.

6. The method of claim 5, wherein the accessors are nilpotent, exception free, and transactional.

7. The method of claim 5, wherein the mutators are idempotent and transactional, and wherein the mutators throw an exception if and only if an attempted change falls.

8. The method of claim 1, further comprising mapping each of one or more of the expressions to one or more collective-property-qualified relations according to the collective properties, wherein each of the relations provides a template that governs the expression representations.

9. The method of claim 1, wherein one or more of the expressions has declarative semantics.

10. The method of claim 1, wherein one or more of the instances of DC As having specified collective properties are derived from one or more other DCAs having specified collective properties.

11. The method of claim 1, wherein one or more of the instances of DCAs having specified collective properties provide a callback interface for generic implementation of a listener pattern.

12. The method of claim 1, wherein one or more of the instances of DC As having specified collective properties include in-scope declarations of one or more sub-types and/or sub-DCAs.

13. The method of claim 1, wherein the computer executable output program representation depends on the specified collective properties.

14. The method of claim 1, wherein the collective properties comprise one or more properties selected from the group including:
    invasiveness, ordering, data structure implementation, behavior on access failure, iterator behavior on attribute change, idempotency on update, instantiating, transactional, concurrency-safe, exception on deletion, deletion on last external reference, relation to type-scope semantics, constraint relations to other attributes, and reactivity to chances of state.

15. The method of claim 1, wherein the collective properties of the one or more instances of DCAs are orthogonal relative to an implementation of the translator such that a number of code blocks being implemented by the translator is less than a number of all possible combinations of the collective properties of the one or more instances of DCAs.

16. The method of claim 15, wherein the collective properties of the one or more instances of DCAs are orthogonal relative to an implementation of the translator such that the translator implements a single code block for each of the collective properties of the one or more instances of DCAs.

17. The method of claim 1, further comprising:
    automatically generating an internal representation,
    wherein the translating of the expressions based at least in part on the specified collective properties or the additional collective properties comprises translating, using the translator, the internal representation to the computer executable output program representation.

18. The method of claim 17, wherein the generating of the internal representation comprises:
    automatically generating, based on the specified collective properties and the inferred additional collective properties, procedure code that implements primitive operations on one or more of the one or more instances of DCAs; and
    automatically generating imperative code that evaluates the one or more expressions involving one or more instances of the DCAs, and that uses at least some calls to at least some the primitive operation.

* * * * *

UNITED STATES PATENT AND TRADEMARK OFFICE
CERTIFICATE OF CORRECTION

PATENT NO. : 10,025,572 B2
APPLICATION NO. : 14/842479
DATED : July 17, 2018
INVENTOR(S) : David R. Cheriton Page 1 of 1

It is certified that error appears in the above-identified patent and that said Letters Patent is hereby corrected as shown below:

In the Specification

Column 6, Line 42, before "Experiment", delete "a" and insert --an--, therefor.

In the Claims

Column 27, Claim 1, Line 8 after "capable of", delete "haying" and insert --having--, therefor.
Column 28, Claim 10, Line 4, after "instances of", delete "DC As" and insert --DCAs--, therefor.
Column 28, Claim 12, Line 12, after "instances of", delete "DC As" and insert --DCAs--, therefor.
Column 28, Claim 14, Line 27, after "reactivity to", delete "chances" and insert --changes--, therefor.

Signed and Sealed this
Thirtieth Day of October, 2018

Andrei Iancu
*Director of the United States Patent and Trademark Office*